United States Patent

Fitzner et al.

Patent Number: 6,066,912
Date of Patent: May 23, 2000

[54] DEVICE FOR TRANSMITTING A DEFLECTION OF AN ACTUATOR

[75] Inventors: Johannes Fitzner, Bernhardswald; Raimondo Giavi, München; Karl Kirchweger; Günter Lewentz, both of Regensburg; Jürgen Rink, Wackersdorf; Gerd Schmutzler, Kareth; Stefan Lehmann; Dirk Baranowski, both of Regensburg, all of Germany

[73] Assignee: Siemens Aktiengesellschaft, Munich, Germany

[21] Appl. No.: 09/057,022

[22] Filed: Apr. 8, 1998

[30] Foreign Application Priority Data

Apr. 8, 1997 [DE] Germany ............ 197 14 486

[51] Int. Cl.[7] .................................................. H02N 2/04
[52] U.S. Cl. ...................................................... 310/328
[58] Field of Search ........................................... 310/328

[56] References Cited

U.S. PATENT DOCUMENTS

| 3,154,700 | 10/1964 | McNaney | 310/328 |
| 4,073,197 | 2/1978 | Arnold et al. | 74/110 |
| 4,593,658 | 6/1986 | Moloney | 123/90.11 |
| 4,622,483 | 11/1986 | Staufenberg et al. | 310/328 |
| 4,856,359 | 8/1989 | Krause | 74/110 |
| 4,890,027 | 12/1989 | Bohner et al. | 310/328 |
| 4,899,999 | 2/1990 | Arnold | 269/240 |
| 5,018,399 | 5/1991 | Sawatzki et al. | 74/110 |

FOREIGN PATENT DOCUMENTS

| 636760 | 12/1978 | U.S.S.R. | 310/328 |
| 748980 | 5/1956 | United Kingdom . | |
| 2 036 910 | 7/1980 | United Kingdom | F16H 21/00 |
| 2193386 | 2/1988 | United Kingdom | H02N 2/00 |

*Primary Examiner*—Thomas M. Dougherty
*Attorney, Agent, or Firm*—Herbert L. Lerner; Laurence A. Greenberg; Werner H. Stemer

[57] ABSTRACT

A mechanical force transmitter converts the deformation of a piezoelectric actuator into a linear movement of a final control element. The transmission is via configuration of two mutually inclined working surfaces and a movable mechanical element disposed between the inclined working surfaces.

21 Claims, 9 Drawing Sheets

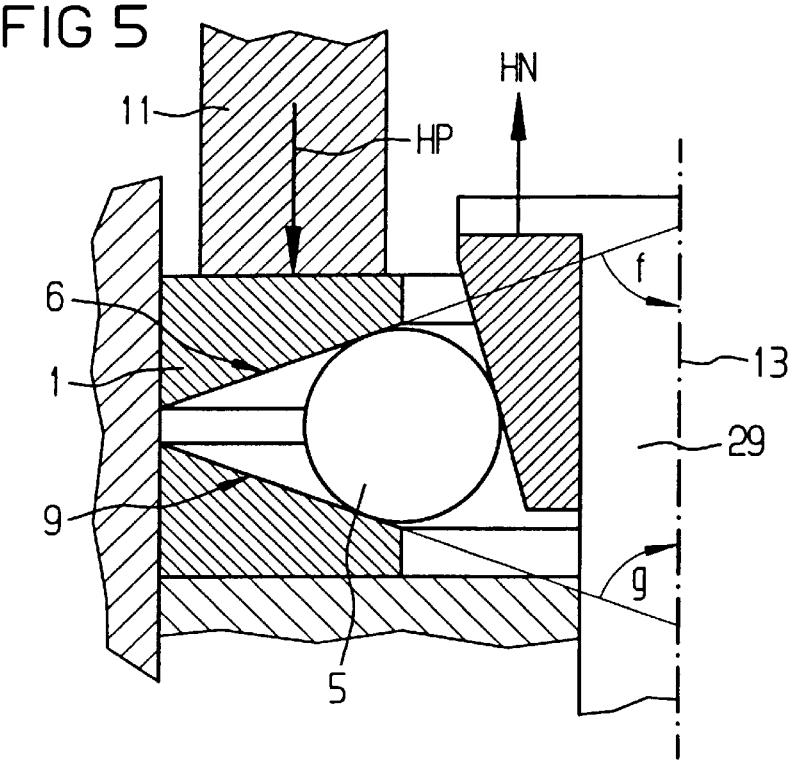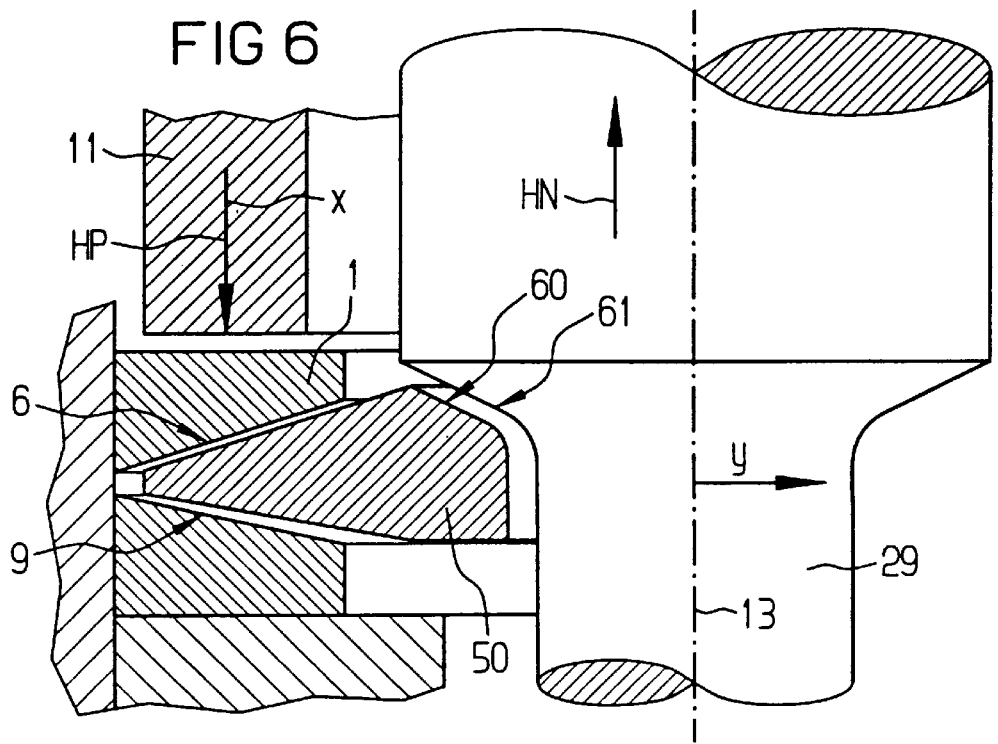

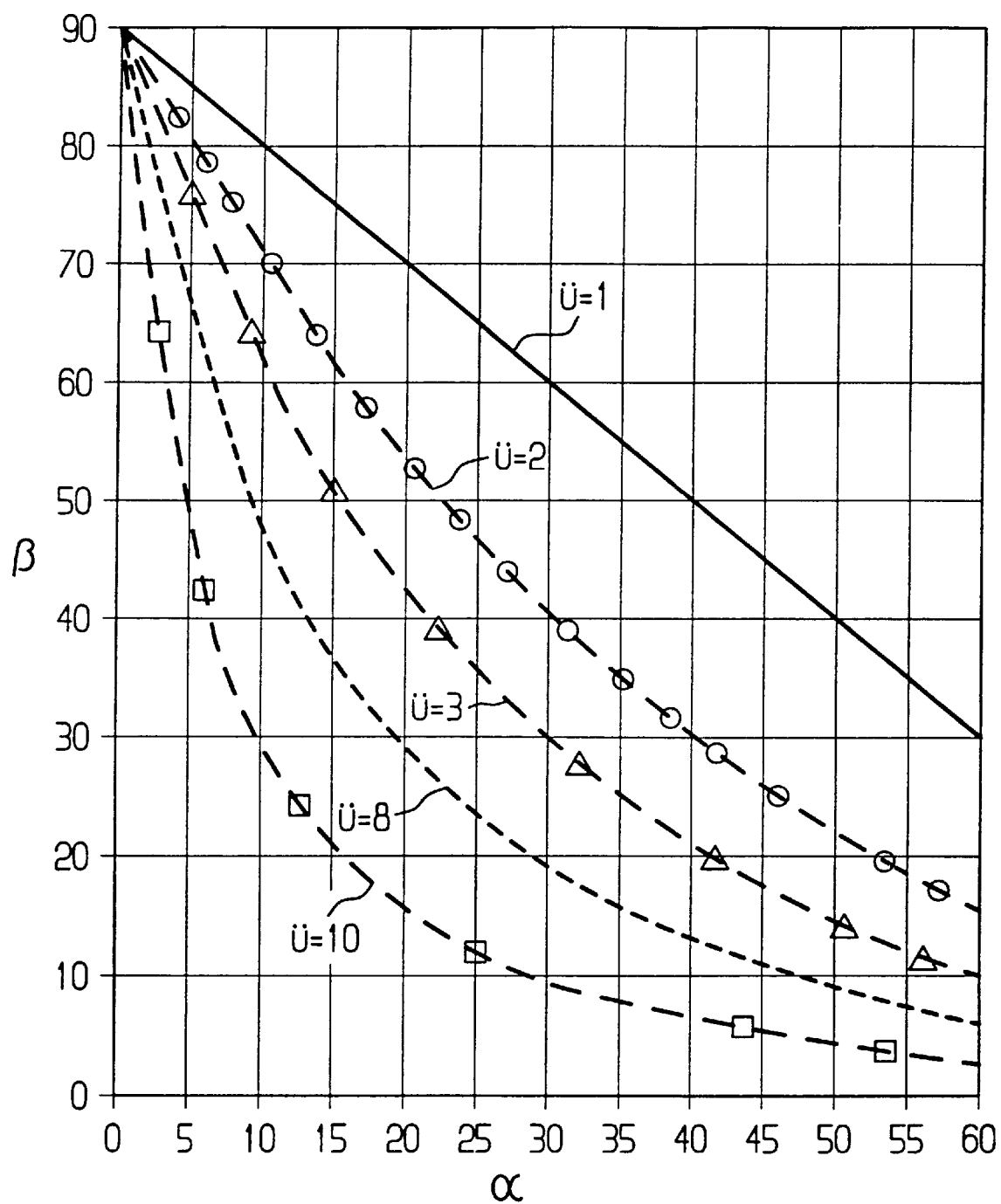

DEVICE FOR TRANSMITTING A DEFLECTION OF AN ACTUATOR

BACKGROUND OF THE INVENTION

Field of the Invention

The invention relates to a device for transmitting a deflection of an actuator to a final control element having a first transmitting part operationally connected to the actuator, and having a second transmitting part operationally connected to the final control element, whereby the first transmitting part has a first working surface and the second transmitting part has a second working surface.

Actuators are used in automotive engineering to drive a final control element, in particular to drive an injection valve. In this case, for example, the actuator controls the nozzle needle directly or hydraulically via a servo-valve.

British patent application GB 21 93 386 A discloses a piezoelectric actuator whose deformation is transmitted to a control piston via a pressure chamber. The pressure chamber serves to transmit and to transform the deflection of the piezoelectric actuator. The pressure chamber is hermetically sealed and filled with a working medium. The piezoelectric actuator uses a large cross-sectional area via a diaphragm to press the working medium into a piston opening which has a small cross-sectional area and in which the control piston is displaceably mounted. In this way, the small deflection of the piezoelectric actuator is transformed into a greater displacement of the control piston by the differently sized cross-sectional areas.

SUMMARY OF THE INVENTION

It is accordingly an object of the invention to provide a device for transmitting the deflection of an actuator, which overcomes the above-mentioned disadvantages of the prior art devices and methods of this general type and which is purely mechanical in nature and which allows doing away with the diaphragm and the hydraulic liquid.

With the foregoing and other objects in view there is provided, in accordance with the invention, a device for transmitting a deflection of an actuator to a final control element, comprising:

a first transmitting part operatively connected with an actuator and being subject to displacement by the actuator, the first transmitting part having a first working surface;

a second transmitting part operatively connected to a final control element, the second transmitting part having a second working surface; and a movable mechanical element interposed between and directly operationally interconnecting the first working surface and the second working surface, whereby a movement of the first transmitting part in a first direction of movement causes the mechanical element to move along the first working surface and along the second working surface and to displace the second transmitting part in a second direction of movement.

With the above objects in view there is also provided, in an alternative, such a device which comprises:

the first transmitting part which is subject to displacement by the actuator and which has the first working surface;
the second transmitting part which displaces the final control element and which has the second working surface;
a first guide for guiding the first transmitting part in a first direction of movement;
a second guide for guiding the second transmitting part in a second direction of movement;
a mechanical element disposed between the first working surface and the second working surface, and supported on a bearing surface, the first working surface, the second working surface, and the bearing surface being arranged in such a way that the mechanical element is restricted to moving only within a single plane of movement;
the first working surface and the mechanical element being formed so that a movement of the first transmitting part in the first direction of movement causes a movement of the mechanical element at least partly transverse to the first direction of movement; and
the second working surface being formed such that the transverse movement of the mechanical element is translated into a movement of the second transmitting part into a second direction of movement.

In accordance with an added feature of the invention, the mechanical element is a freely movable ball or a freely movable wedge segment.

In accordance with an additional feature of the invention, the first working surface is an inner conical surface (a concave surface), the second working surface is an outer conical surface (a convex surface), the outer conical surface is surrounded by the inner conical surface, the outer conical surface is inclined toward the inner conical surface, and the bearing surface extends at a predefined angle relative to an axis of symmetry of the device, and preferably at a right angle.

In accordance with another feature of the invention, the bearing surface is an inner conical surface disposed symmetrically relative to the axis of symmetry and facing towards the first working surface.

In accordance with a further feature of the invention, one of the first and second working surfaces, along a line of movement of the mechanical element, has at least two subsurfaces oriented at different angles relative to an axis of symmetry of the device.

In accordance with again a further feature of the invention, one of the first and second working surfaces, along a line of movement of the mechanical element, has a defined curved surface.

In accordance with again an added feature of the invention, the first transmitting part and the second transmitting part are disposed substantially adjacent one another; wherein the first and second working surfaces converge at an angle of less than 180° towards one another, the bearing surface extends at an angle of less than 90° relative to the first working surface and to the second working surface; the bearing surface, the first working surface, and the second working surface together defining a bearing space in which the mechanical element is disposed; and wherein, during a movement of the first transmitting part, the mechanical element is displaced laterally towards the second transmitting part, and the second transmitting part is moved counter the direction of movement of the first transmitting part.

In accordance with again an additional feature of the invention, the first transmitting part, the second transmitting part, the mechanical element, and the actuator, are prestressed relative to one another.

In accordance with a concomitant feature of the invention, the first transmitting part, the second transmitting part, and the second guide element together form an elastic cage in which the mechanical element is guided.

With the above and other objects in view there is also provided, in accordance with the invention, a device for transmitting a deflection of an actuator to a final control element, comprising:

a first transmitting part operatively connected with an actuator and being subject to displacement by the actuator, the first transmitting part having a first working surface;

a second transmitting part operatively connected to a final control element, the second transmitting part having a second working surface;

the first transmitting part being guided laterally in a first direction of movement;

the second transmitting part being guided laterally in a second direction of movement; and the first working surface and the second working surface being oriented at a defined angle relative to the first direction of movement and sliding directly on one another such that, during a movement of the first transmitting part, the second transmitting part is moved at least partly sideways relative to the first direction of movement.

An essential advantage of the invention consists in the fact that the deflection of the actuator is transmitted with only mechanical means and, accordingly, the device functions precisely and reliably.

Other features which are considered as characteristic for the invention are set forth in the appended claims.

Although the invention is illustrated and described herein as embodied in a device for transmitting a deflection of an actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a partial sectional view of a ball-type transmitter with an inclined bearing surface;

FIG. 6 is a partial sectional view of a transmitting device with a control wedge;

FIG. 8 is a diagram with various transmission ratios; and

DESCRIPTION OF THE PREFERRED EMBODIMENTS

The essential concept of the invention is found in the fact that the transmitter is constructed in a purely mechanical fashion and that the deflection of the actuator is transmitted directly to a final control element. Two working surfaces which are inclined relative to one another and operationally interconnected via a mechanical element are used as essential elements. Both working surfaces are inclined relative to one another in such a way that during a movement of the first working surface, the mechanical element is pressed against the second working surface, and the movement of the first working surface is thereby transmitted to the second working surface.

Figure 1:
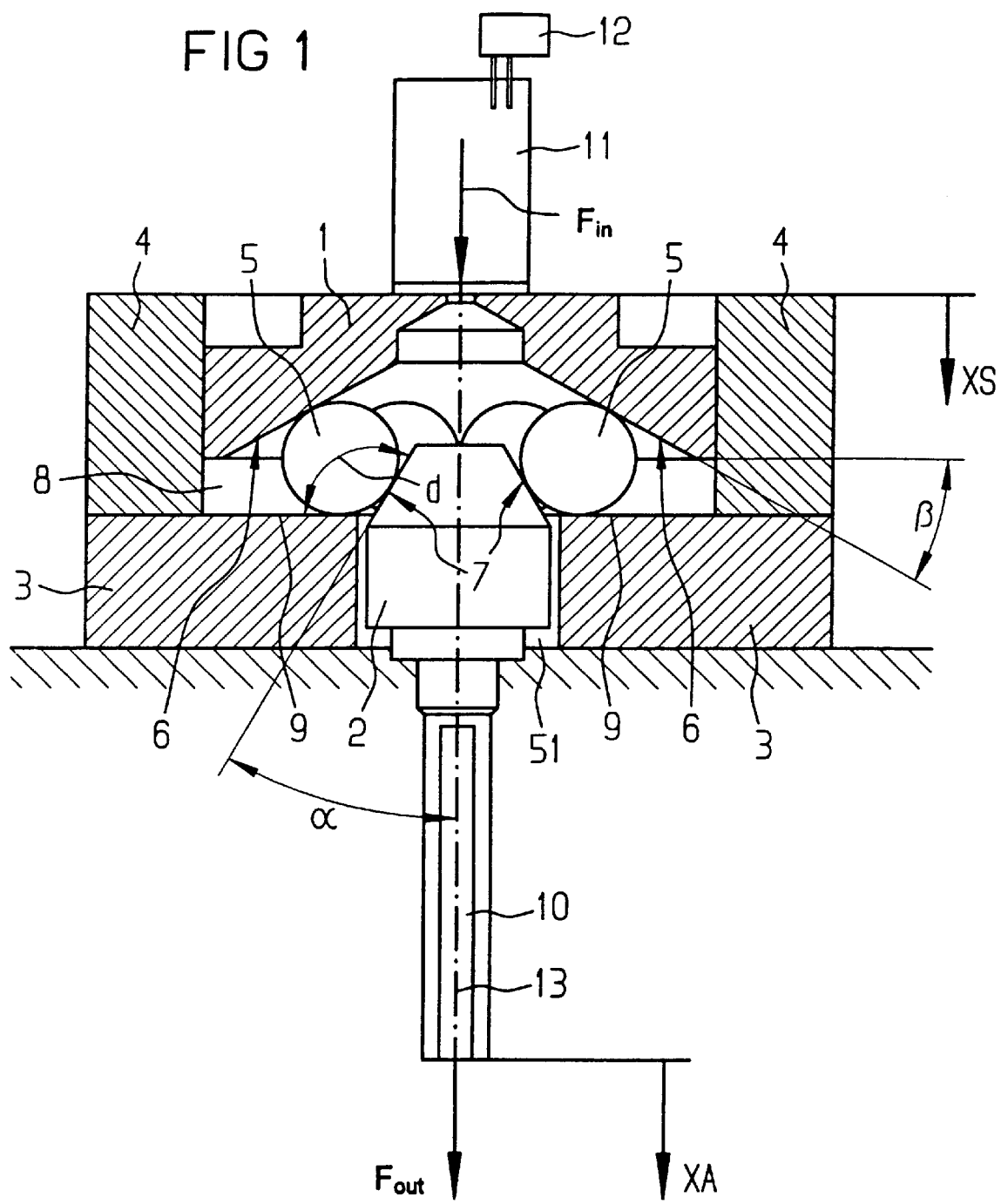
FIG. 1 is a longitudinal sectional view of a ball-type force transmitter.

Referring now to the figures of the drawing in detail and first, particularly, to FIG. 1 thereof, there is seen a part of an injection valve in which a valve nozzle needle is controlled via an actuator 11 and a final control element 10. The deflection or deformation of the actuator 11—a piezoelectric actuator in the exemplary embodiment—is transmitted via a first transmitting part 1, which is arranged in a guide ring 4 so that it can move in a first direction of movement. The first transmitting part 1 essentially has the shape of a cylindrical disk into which a recess in the shape of a conical frustum is introduced from the underside. The first transmitting part 1 therefore has on the underside an inner conical surface 6, which is aligned symmetrically relative to an axis of symmetry 13. The inner conical surface is arranged in this case at a prescribed first angle P to a perpendicular relative to the axis of symmetry 13, and represents a first working surface 6. FIG. 1 shows the first transmitting part 1, which essentially represents an axial piston, in cross section. The first transmitting part 1 is rotationally symmetrical relative to the axis of symmetry 13. The guide ring 4, which is disposed centrally relative to the axis of symmetry 13, is seated on a second guide element 3. The second guide element 3 essentially has the shape of a disk, and is arranged symmetrically relative to the axis of symmetry 13. A guiding recess 51 is formed in the middle of the guide element 3 in which a control piston 2 is mounted movably in the first direction of movement. The control piston 2 represents a second transmitting part. In the longitudinal direction, the control piston 2 is symmetrical relative to the axial piston 1 and to the axis of symmetry 13 and, in the upper end region, has the shape of a conical frustum. The conical frustum (i.e., the annularly circumferential conical surface) defines a second working surface 7. The second working surface 7 is aligned at a prescribed second angle α with respect to the axis of symmetry 13.

In the interior of the guide ring 4, the second guide element 3 has an annularly circumferential bearing surface 9, which faces the first transmitting part 1 and is orthogonal to the axis of symmetry 13. Constructed between the first working surface 6, the bearing surface 9 and the second working surface 7 is a bearing space 8 in which there are arranged a plurality of balls 5 distributed uniformly over the bearing surface 9. The balls are roller-bearing balls, for example. In functioning, the bearing surface 9 represents a working surface which is to be arranged at an optimum angle. The first working surface 6, the second working surface 7 and the bearing surface 9 restrict each ball 5 to a plane, with the result that the balls 5 can only move freely about the axis of symmetry 13 in the bearing space 8. The bearing surface 9 and the first working surface 6 enclose with one another the first angle β, which is less than 90°. When the first transmitting part 1 moves in the direction of the second guide element 3 the balls 5 are pressed inward in the direction of the axis of symmetry 13.

Due to the fact that each ball 5 bears in the rest position against the second working surface 7, and the second working surface 7 encloses with the bearing surface 9 a third angle d greater than 90°, during a movement of the ball 5 inward in the direction of the axis of symmetry 13, the second transmitting part 2 is pressed away from the first transmitting part 1 downward in the direction of the final control element 10.

The device of FIG. 1 operates as follows:

In the rest position, the first working surface 6, the second working surface 7 and the bearing surface 9 bear against the ball 5. When the piezoelectric actuator 11 is excited and deformed by the control unit 12, the piezoelectric actuator 11 expands and in so doing presses the first transmitting part 1 in the direction of the second guide element 3. In this process, the longitudinal movement of the first transmitting part 1 is converted by the alignment, arranged at the first angle, of the first working surface 6 and the bearing surface 9, arranged at right angles to the axis of symmetry 13, into a movement, directed laterally inward in the direction of the axis of symmetry 13, of the ball 5. The ball 5 thus presses against the second working surface 7 and pushes the second transmitting part 2 downward, since the second working surface 7 converges conically upward at the first angle relative to the axis of symmetry 13.

By using a plurality of balls 5—distributed uniformly on the annularly circumferential bearing surface 9—a uniform and symmetrical transmission of the longitudinal movement of the first transmitting part 1 to the second transmitting part 2 is ensured. Canting or jamming of the first or the second transmitting part 1, 2 is avoided by the preferential spherical shape of the mechanical element 5. The balls 5 are preferably produced from steel or other materials such as ceramic, for example.

A particularly low-friction bearing of the balls 5 is achieved by virtue of the fact that the bearing space 8, which is constructed between the first working surface 6, the second working surface 7 and the bearing surface 9, is filled with oil or sliding grease. If oil or sliding grease is used, the second transmitting part 2 is sealed with respect to the second guide element 3, and the first transmitting part 1 is sealed with respect to the guide ring 4 via sealing rings so that no oil or grease escapes from the bearing space 8.

In order for no unnecessary play to occur between the balls 5, the first working surface 6, the second working surface 7 and the bearing surface 9, the first transmitting part 1 and the balls 5 are prebiassed relative to the piezoelectric actuator 11, through the second guide element 3, by an appropriate adjustment or by non-illustrated spring elements.

A transformation of the deflection of the piezoelectric actuator 11 is achieved by virtue of the fact that the first angle β and the second angle α stand at an appropriate ratio to one another. The transmission ratio Ü is fixed in this case by the following formula:

$$\ddot{U} = HP/HN = \frac{1}{\tan\alpha \cdot \tan\beta}$$

where HP is the deflection of the actuator 11, and HN is the deflection of the final control element 10. If, for example, the first angle β and the second angle α each assume a value of 30°, the result is a transformation ratio of 3. This means that in the case of a deflection of the piezoelectric actuator 11 by 40 mm, the final control element 10 is deflected by 120 mm.

Figure 2:
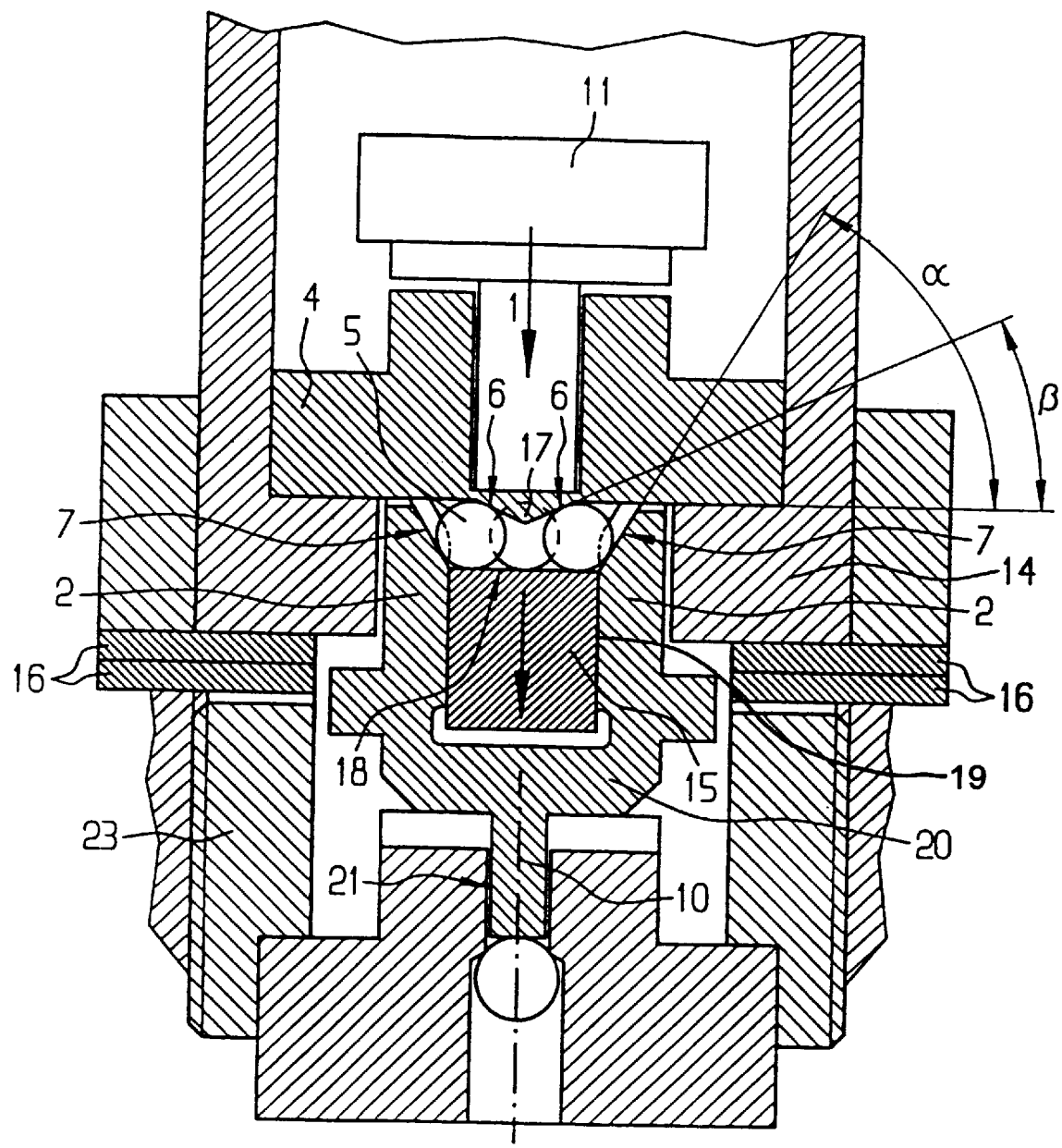
FIG. 2 is a partial sectional view of a second embodiment of a ball-type transmitter with a servo-valve.

Referring now to FIG. 2, there is shown a further embodiment of the mechanical transmitter, in which the first transmitting part 1 has a conically converging tip pointing in the direction of the second transmitting part 2. The first transmitting part 1 is constructed as a cylinder with a cone tip 17, which represents the first working surface 6. The cone tip 17 is assigned a bearing block 15 which is firmly connected, via connecting webs, to the guide ring 4 and the housing 14 of the injection valve, without obstructing the movement of the second transmitting part 2 away from the actuator 1. The bearing block 15 has a circular bearing surface 18. The bearing surface 18 is symmetrical relative to the cone tip 17 and faces the cone tip 17. The bearing surface 18 is bounded laterally by an annularly circumferential second working surface 7 of a second transmitting part 2. The bearing surface 18, the first working surface 6 and the second working surface 7 define a circular bearing space in which there are introduced balls 5 whose movement is fixed in a plane.

The second transmitting part 2 is constructed in this exemplary embodiment as a hollow cylinder 19 which is closed at one end and which merges into a base plate 20 which is continued in a final control element 10. The final control element is arranged centrally in relation to the base plate 20 and parallel in the longitudinal direction to the hollow cylinder 19. The final control element 10 projects through an opening 21 which is led to a closing member of a servo-valve. The first working surface 6 encloses an angle β with the bearing surface 18, and the second working surface 7 encloses a second angle α with the bearing surface 18.

The device of FIG. 2 operates as follows:

When the piezoelectric actuator 1 is triggered via the control unit 12, the piezoelectric actuator 11 expands and pushes the first transmitting part 1 in the direction of the second transmitting part 2. As a consequence, the balls 5 are pressed away laterally to the outside, since the position of the bearing block 15 is fixed. The balls 5 move away radially outward from the axis of symmetry 13, and in so doing press the second transmitting part 2 downward via the second working surface 7. This results in the final control element 10 pressing against the valve closing member of the servo-valve and opening the servo-valve.

Similarly to FIG. 1, a conversion of the deflection of the actuator 11 is defined by an appropriate choice of the first and second angles. The spacing between the servo-valve and the actuator 11 is set via spacer disks 16, which are introduced between the servo-valve housing 23 and the housing 14. The essential difference by comparison with FIG. 1 is found in the fact that the balls 5 are pressed from the inside upward.

Figure 3:
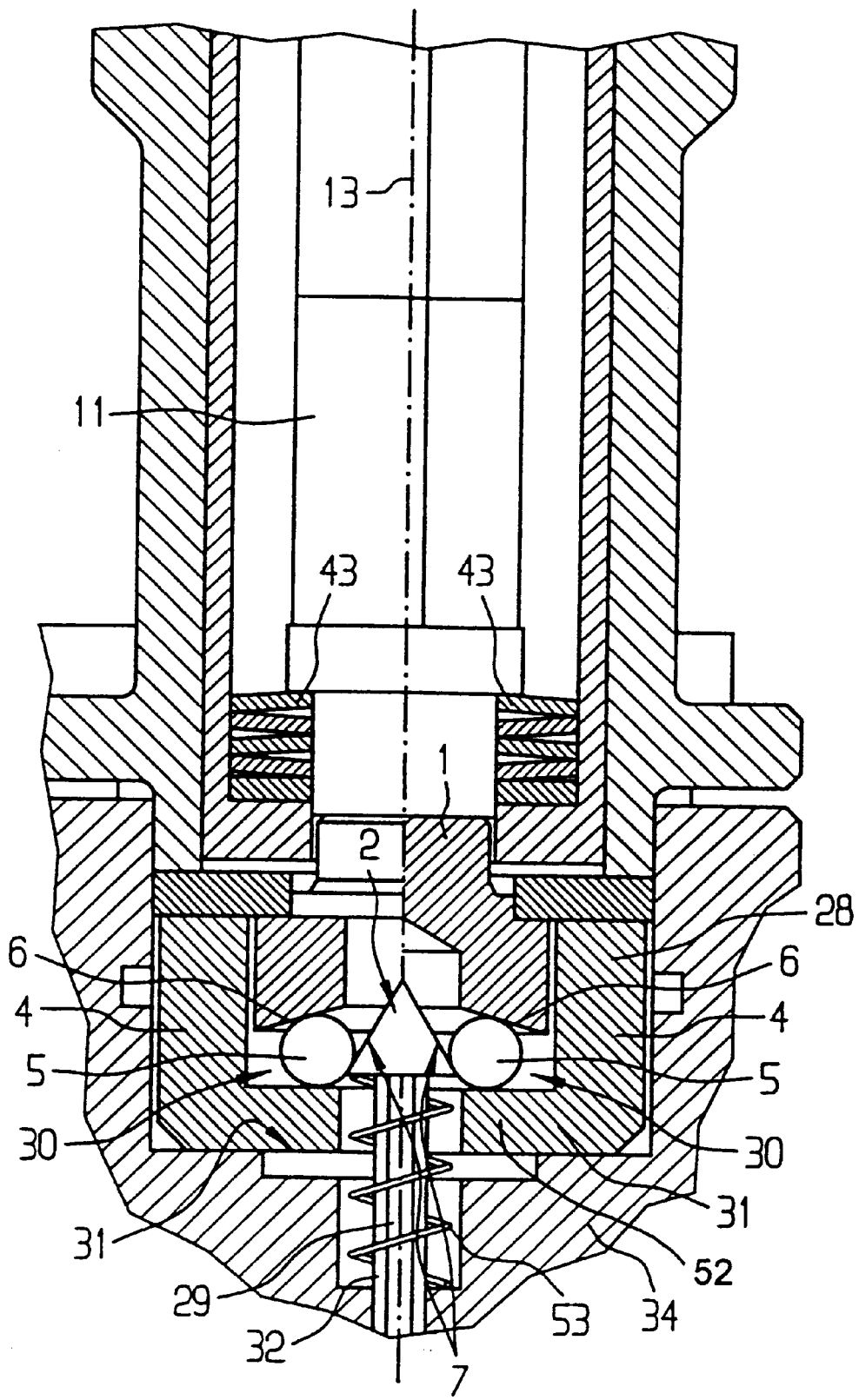
FIG. 3 is a partial sectional view of an injection valve with a piezoelectric actuator.

FIG. 3 shows diagrammatically a part of an injection valve having a piezoelectric actuator 11 which drives a closing member of a servo-valve via the transmitting device according to the invention. The closing member regulates the opening cross section via which a pressure space is connected to a relief line which is guided to the fuel tank. The first transmitting part 1 is constructed on the outside as a stepped cylinder which has a conical recess on the underside. The first working surface 6 is formed by the conical recess. In the exemplary embodiment, the first working surface 6 is a conical surface which is arranged symmetrically relative to the axis of symmetry 13. The first transmitting part 1 is introduced into a hollow cylinder 28 and it is movably disposed in the longitudinal direction of the hollow cylinder 28, the first transmitting part 1 preferably being guided to the side of the hollow cylinder.

The first working surface 6 is assigned to the base plate 31 of the hollow cylinder 28. Provided in the base plate 31 in a central fashion in relation to the axis of symmetry 13 is a bushing 52 through which a control piston 29 projects into the hollow cylinder 28. The upper end of the control piston 29 is constructed as a second transmitting part 2. The second transmitting part 2 is constructed in this case as a conically converging cone tip which is arranged centrally in relation to the axis of symmetry 13. A circumferential transmitting space 30 which houses all of the balls, i.e., the mechanical elements 5, is formed between the first working surface 6, the base plate 31, and the second transmitting part 2.

A guide bore 32 is formed in the housing 34 of the injection valve adjacent to the opening of the base plate 31. The control piston 29 is guided in the guide bore 32. The guide bore 32 extends centrally in the injection valve up to a valve chamber.

The guide bore 32 is constructed with a large cross section in the upper region adjacent to the base plate 31, and merges in the lower region into a second, small cross section which is adjacent to the valve chamber. Provided in the upper region is a spring 53 which pretensions the control piston 29 and the second transmitting part 2 in the direction of the first transmitting part 1.

The dimensions of the first transmitting part 1, the second transmitting part 2, the mechanical elements 5 and the hollow cylinder 19 with the base plate 31 are selected in such a way that in the state of rest the first transmitting part 1, the second transmitting part 2 and the base plate 31, which in this case represents a bearing surface, rest on a mechanical element 5. It is preferable to arrange a plurality of balls 5 in the transmitting space 30 distributed uniformly around the second transmitting part 2.

The device of FIG. 3 functions as follows:

In the rest position, the piezoelectric actuator 11 is not driven, and the first transmitting part 1 and the second transmitting part 2 are located in a rest position. When the piezoelectric actuator 11 is driven, the piezoelectric actuator 11 presses the first transmitting part 1 in the direction towards the base plate 31. As a result, the first working surface 6, which converges conically upward in the direction of the axis of symmetry 13, presses the balls 5 radially inward in the direction towards the axis of symmetry 13. As a consequence, the second transmitting part 2 is pressed downward against the spring force of the tension spring 53 by the second working surface 7, which converges conically upward. The lower end of the control piston 29 presses a closing member away from the assigned seal seat, for example, with the result that a servo-valve is opened, or an injection opening is directly opened and injection is performed.

If the drive of the piezoelectric actuator 11 is interrupted, the piezoelectric actuator 11 is pressed away from the first transmitting part 1 into the rest position by disk springs 43. The disk springs 43 are introduced between the actuator and the actuator housing and they bias the actuator against deflection.

The pressure of the first transmitting part 1 on the balls 5 and the control piston 29 thus weakens. As a consequence of this, the tension spring 53 presses the control piston 29 and the second transmitting part 2 upward in the direction of the first transmitting part 1. The mechanical elements 5 are pressed outward, and the first transmitting part 1 moves upward in the direction of the piezoelectric actuator 11. The control piston 29 is consequently moved upward into its rest position.

In this third exemplary embodiment, the essential functional feature of the transmitting device is that the movement of the piezoelectric actuator 11 is transmitted to the control piston 29 by an appropriate choice of the angles and geometry in which the first working surface 6, the base plate 31, and the second working surface 7 are arranged relative to one another. By an appropriate choice of the angles at which the first and the second working surface 6, 7 are inclined to one another, in accord with FIG. 1, the deflection of the actuator 11 is transformed into a correspondingly greater or smaller deflection of the control piston 29.

Figure 4A:
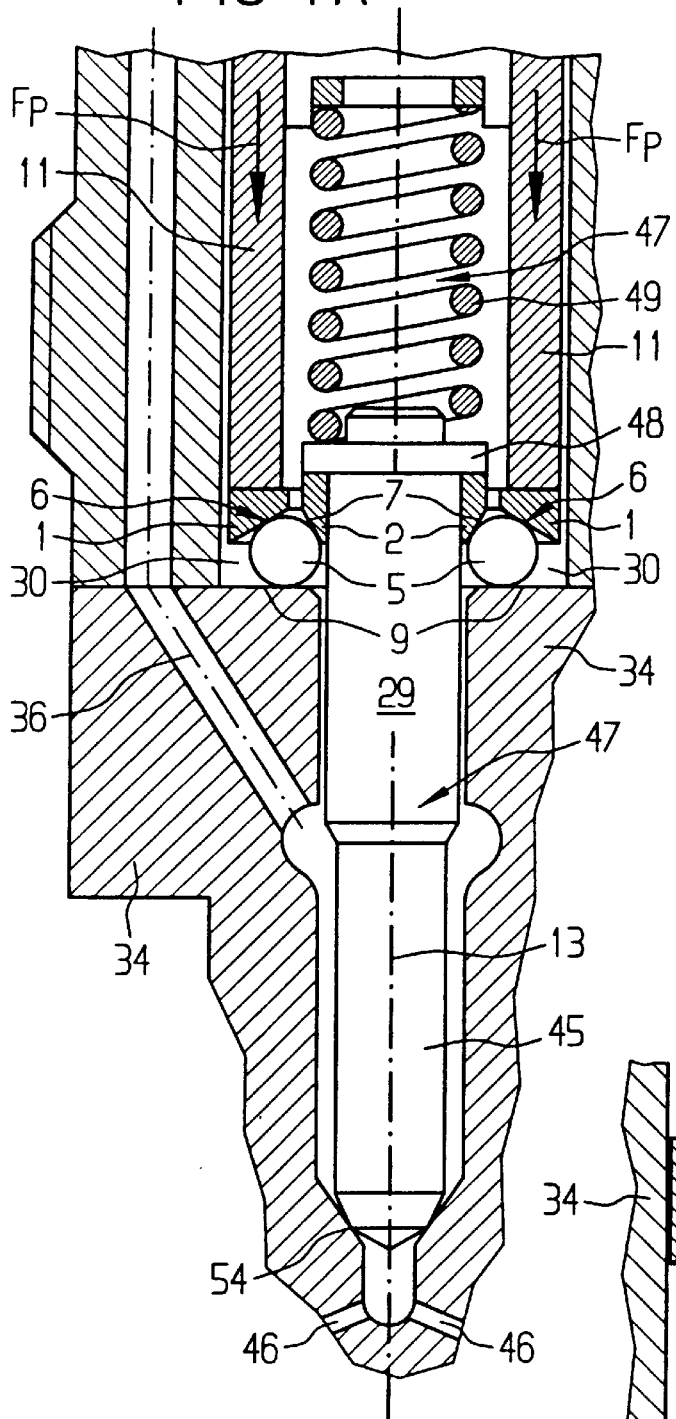
FIG. 4A is a partial sectional view of an injection valve with a ball-type transmitter, in which the direction of movement of the actuator is contrary to the direction of movement of the final control element.

Referring now to FIG. 4A, there is shown a diagrammatic illustration of a part of an injection valve in which the direction of movement of the piezoelectric actuator is designed to be opposite to the direction of movement of the control piston 29 or a nozzle needle 45. In this exemplary embodiment, the control piston 29 is constructed in one piece with the nozzle needle 45. As a result, the piezoelectric actuator 11 has a direct mechanical action on the movement of the nozzle needle 45.

The housing 34 of the injection valve has a control bore 47 in which the control piston 29 and the nozzle needle 45 are mounted capable of moving in the longitudinal direction relative to the axis of symmetry 13 of the injection valve. Provided in the upper region of the control bore 47 is a control spring 49 which presses the control piston 28 in the direction of the sealing seat 54 of the nozzle needle 45. Provided at the upper end of the control piston 29 is a stop ring 48 on the control piston 29, to which a second transmitting part 2 is fastened. In this exemplary embodiment, the second transmitting part 2 has the form of a hollow cylinder, the upper end face of the hollow cylinder being fastened to the stop 48.

The second transmitting part 2 is downwardly beveled and in the direction of the axis of symmetry 13. The beveled second end face represents a second working surface 7 which is constructed at a prescribed angle to the axis of symmetry 13. The angle converges downward and is between 0° and 90°. The second working surface 7 thus represents an annularly circumferential surface of a conical frustum.

The second transmitting part 2 is surrounded by a first transmitting part 1 which in this case is likewise constructed as a hollow cylinder and is essentially arranged at the same level as the second transmitting part 2. The first transmitting part 1 rests with its surface on the piezoelectric actuator 11. The piezoelectric actuator 11 is likewise essentially constructed as a hollow cylinder, and advantageously rests on the entire top side of the first transmitting part 1. The underside of the first transmitting part 1 is beveled upward in the direction of the axis of symmetry 13, and represents a first working surface 6. The first working surface 6 is arranged at a prescribed angle to the axis of symmetry 13, which is between 90° and 0°, and converges upward. The first working surface 6 is thus constructed as an annularly circumferential surface of a conical frustum which is inclined upward and inward.

In this way, the first and the second working surfaces 6, 7 enclose an angle with one another which is less than 180°, and thus represents an annularly circumferential holding recess for mechanical elements 5 (preferably the balls 5). The balls 5 are fixed by the first and the second working surfaces 6, 7 and by a bearing surface 9 which is constructed by the housing 34 in an annularly circumferential fashion and at right angles to the axis of symmetry 13. The bearing surface 9 is arranged at an angle of less than 90° in each case to the first and second working surfaces 6, 7.

In the rest position, the control piston 29 and the nozzle needle 45 are pressed downward, with the result that the nozzle needle 45 rests on the assigned sealing seat 54 and there is no connection between the high pressure line 36 and the injection nozzles 46. If the piezoelectric actuator 11 is now triggered, the piezoelectric actuator 11 presses the first transmitting part 1 downward and, therefore, the balls 5 inward in the direction of the control piston 29. As a consequence of this, the second transmitting part 2 is pressed upward against the spring force of the control spring 49, and the nozzle needle 45 is raised from the sealing seat 54. Fuel therefore flows from the high pressure line 36 to the injection nozzle 46 and is injected. If the trigger signal for the piezoelectric actuator 11 is interrupted, the piezoelectric actuator 11 contracts and thus relieves the first transmitting part 1. As a consequence, the second transmitting part 2 is pressed downward in the direction of the bearing surface 9 by the control spring 49 via the stop 48. Consequently, the balls 5 are pressed away outwardly, and the first transmitting part 1 moves upwardly in the direction of the piezoelectric actuator 11. At the same time, the nozzle needle 45 is pressed onto the assigned sealing seat 54, with the result that injection stops. The spring force of the control spring 49 is thus greater than the hydraulic force which acts on the nozzle needle 45.

In this exemplary embodiment, the transmitting space 30 is an annular chamber formed, on the one hand, by a bearing surface 9 at right angles to the alignment of the control piston 29, and, on the other hand, by two first and second working surfaces 6, 7, which converge conically upward.

In the preferred embodiment, a multiplicity of balls 5 are uniformly distributed about the annular transmitting space 30.

Figure 4B:
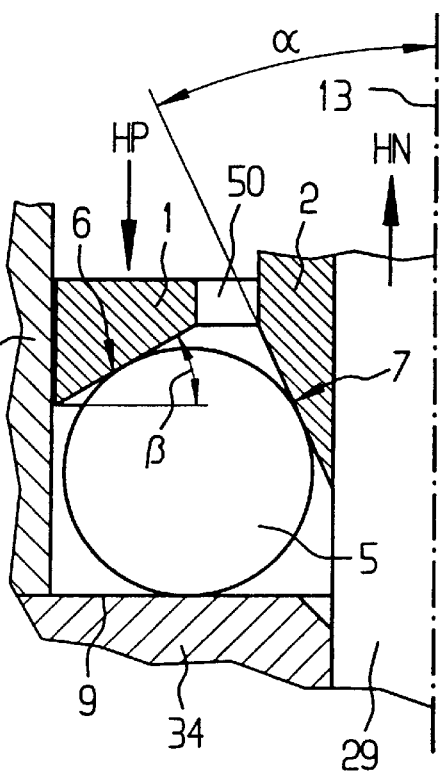
FIG. 4B is a detail view of FIG. 4A.

With reference to the enlarged detail of FIG. 4B, the first angle β defines the orientation of the first working surface 6, and the second angle α defines the orientation of the second working surface 7. A transformation between the first deflection HP of the piezoelectric actuator 1 and the second deflection HN of the nozzle needle 45 is established by the following formula:

$$HP/HN=1/\tan\alpha \cdot \tan\beta),$$

or $$\beta=\arctan(HP/(HN \cdot \tan\alpha))$$

An appropriate transmission of the deflection of the actuator 11 is established by the choice of the first and the second angle.

FIG. 5 shows a further advantageous embodiment of the invention. Here, the ball 5 is bounded by a first transmitting part 1, with a first working surface 6, and a second bearing surface 9. The second bearing surface 9 represents a third working surface, which is not, as in the previous examples of FIGS. 1 to 4, orthogonal to the axis of symmetry 13, but is at a prescribed fourth angle g to the axis of symmetry 13.

In this exemplary embodiment, the second bearing surface 9 is symmetrical relative to the first working surface 6, which is oriented at an angle f, corresponding to the fourth angle g, to the axis of symmetry 13. This permits a particularly low-friction movement of the mechanical element 5.

FIG. 6 shows an embodiment of the invention in which the first transmitting part 1 and the bearing surface 9 are constructed in accordance with FIG. 5. Here, however, the ball 5 is replaced by a wedge 50 converging conically in the direction of the transmitting part 1. The wedge 50 is inserted between the transmitting part 1 and the bearing surface 9. This converts the linear movement of the piezoelectric actuator 11 in the x-direction into a linear movement of the wedge 50 which is diverted by 90°. When the piezoelectric actuator 11 is expanded, the first transmitting part 1 is pressed downward in the x-direction, and the wedge 50 is thus moved away in the y-direction from the first transmitting part 1. In this exemplary embodiment, instead of a ball 5 a wedge 50 is arranged as mechanical element for transmitting the movement of the piezoelectric actuator 11. The wedge 50 has a control surface 60 which slides on a corresponding sliding surface 61 of the control piston 29. If the piezoelectric actuator 11 is now expanded by the distance HP, the wedge 50 is pressed in the y-direction in the direction of the control piston 29. As a consequence, the control surface 60 is displaced against the sliding surface 61, and the control piston 29 is displaced upward against the deflection of the piezoelectric actuator by the distance HN. Owing to an appropriate arrangement of the control surface 60 and the sliding surface 61, the control piston 29 is displaced in the same direction as the piezoelectric actuator 11. The sliding surface 61 and the control surface 60 are preferably parallel to one another. The sliding surface 61 represents a second working surface 7. The transmission ratio between the deflection HP of the actuator 11 and the deflection HN of the control piston 29 is established by the choice of the angles at which the first working surface 6, the bearing surface 9, and the sliding surface 61 are arranged to one another.

Figure 7A:
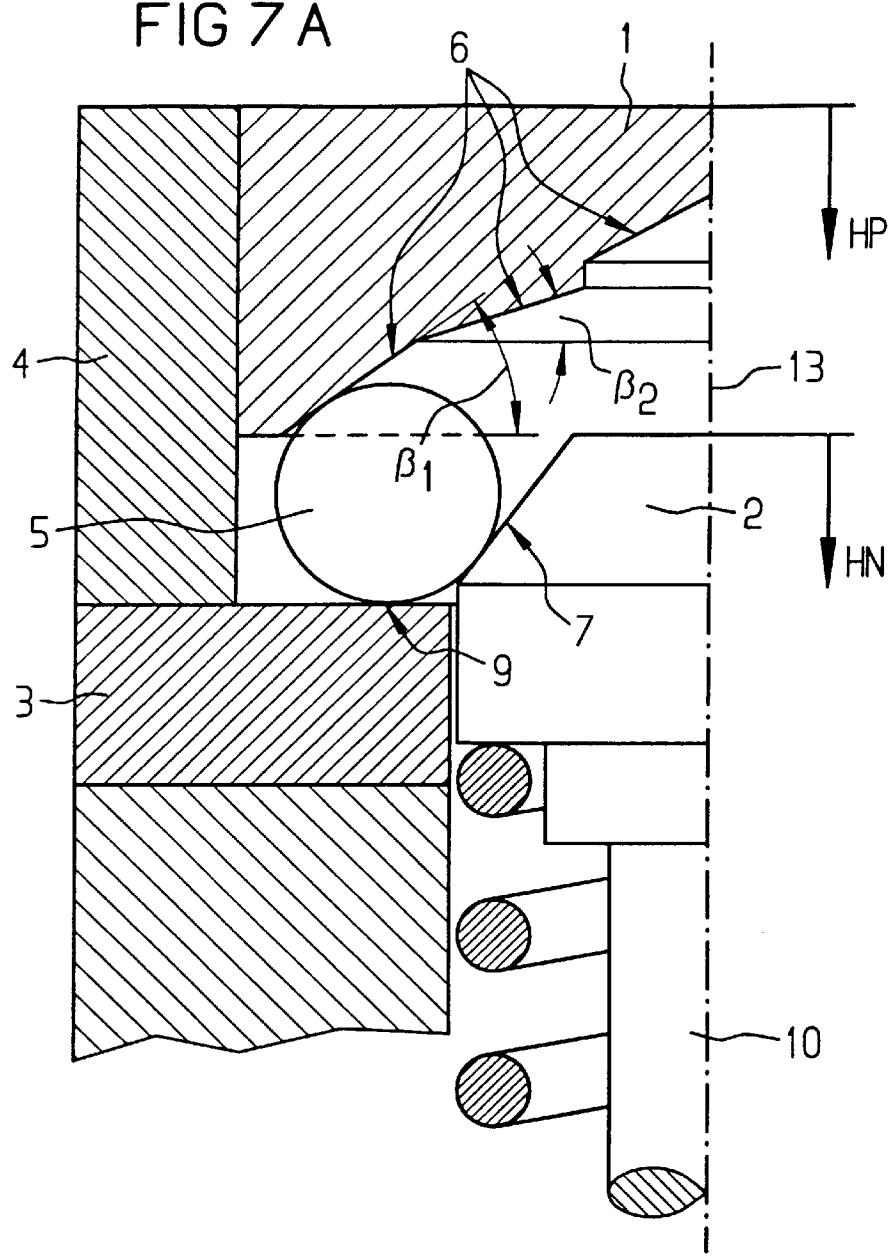
FIG. 7A is a partial sectional view of a ball-type transmitter with a stepped first working surface.

FIG. 7A shows a first transmitting part 1 which has a first working surface 6 which is aligned at different first angles β1, β2.

Figure 7B:
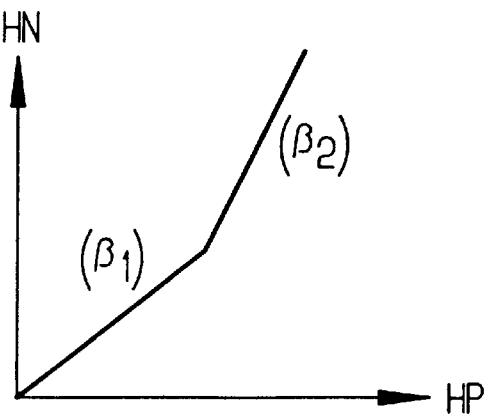
FIG. 7B is a diagram showing the impact of the working surface orientation on the deflection of the actuator and the final control element.

Owing to the different first angles β1, β2, the deflection HP of the piezoelectric actuator 11 produces a different transformation for the deflection HN of the final control element 10. FIG. 7B shows a functional relationship between the deflection HP of the actuator 11 and the deflection HN of the final control element 29. It is possible in this way to change the transformation via the deflection of the actuator 11. It is also possible to adapt the transformation to provide an advantageous force translation.

It is quite advantageous in the context of a pressurized injection valve to carry out the opening operation, in which a higher expenditure of force is required, with a low path transformation, and to carry out the further opening operation after opening of the injection valve with a greater path transformation.

Instead of the stepped first angles β1, βb2, it is a development of the invention to construct the first working surface 6 in the form of an arbitrary curve, with the result that different path transformations can be represented as a function of the deflection of the actuator 11.

Figure 7C:
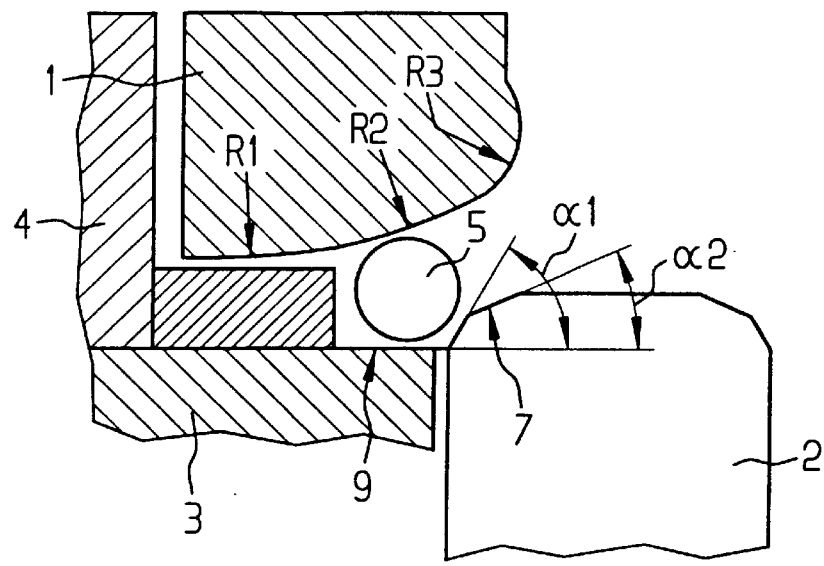
FIG. 7C is a partial sectional view showing variations in the working surface.
Figure 7D:
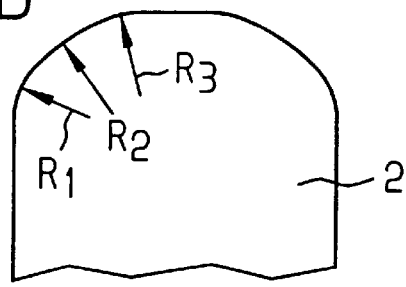
FIG. 7D is a partial elevational view of the working surface angles on the actuating piston.

It is likewise advantageous also to construct the second transmitting part 2 in a stepped fashion with second angles α1, α2 differing over the second working surface 7, or to construct the second working surface 7 in an arbitrary, advantageous curve, as represented in FIG. 7D. The essential idea resides in using an appropriate geometrical construction of the first and/or the second working surface 6, 7 to change the transformation ratio as a function of the deflection of the actuator 11.

Figure 7E:
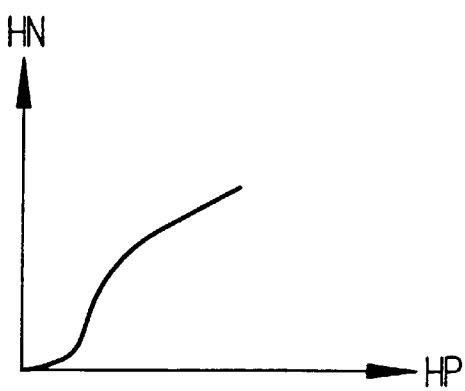
FIG. 7E is a corresponding deflection ratio diagram.

FIG. 7E shows, by way of example, the deflection HN of the final control element 10 as a function of the deflection HP of the actuator 11, in which the transformation ratio changes by the deflection HP.

FIG. 7C shows a first transmitting part 1 in which use is made over the first working surface 6 of three radii of curvature R1, R2, R3 of different size over the curve along which the ball 5 rolls during deflection of the actuator 11. At the same time, the second transmitting part 2 is constructed as a second working surface 7, which is stepped with large second angles α1, α2 of different size.

FIG. 7D shows a second transmitting part 2 which has different radii of curvature over the second working surface 7. It will be appreciated that, depending on the application, those of skill in the art will choose an advantageous combination of different angles or different radii of curvature for the first and the second working surfaces 6, 7.

FIG. 8 shows a diagram in which the first angle β, which is measured at right angles to the axis of symmetry 13, is plotted against the second angle α, which is measured in relation to the axis of symmetry 13. The transformation or transmission ratio Ü results for various angle combinations. The transformation ratio is graphed with regard to a ball as the mechanical element 5.

By way of example, a first angle β of 30° and a second angle α of 30° produce a transformation ratio of 3, that is to say a 10 mm deflection of the actuator 11 is transformed into a 30 mm deflection of the control piston 10. Other numerical examples become immediately evident from a reading of the graph.

Figure 9:
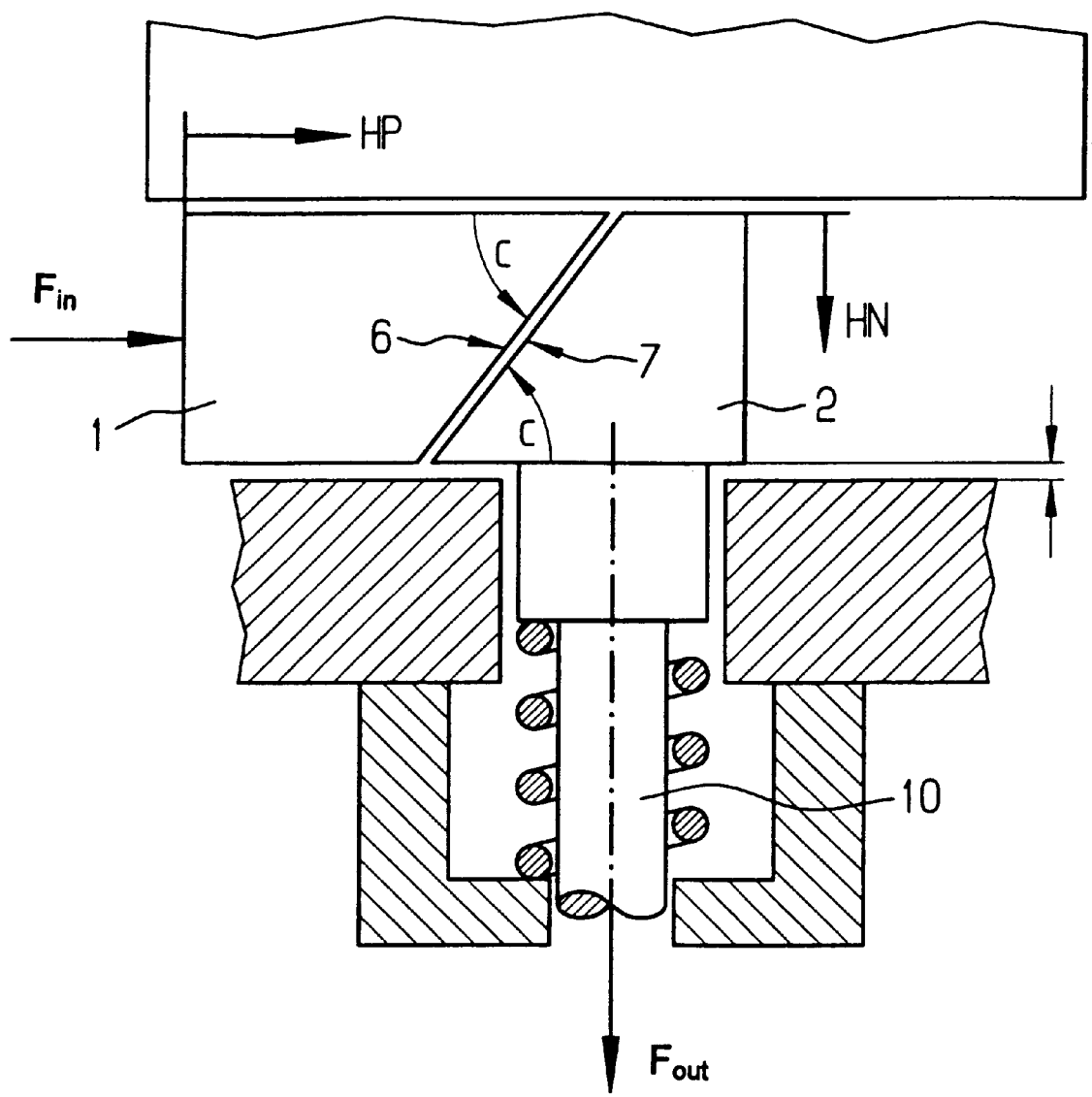
FIG. 9 is a partial sectional view of a device for transmitting a deflection with two inclined working surfaces.

FIG. 9 illustrates an embodiment in which the first transmitting part 1 rests directly with the first working surface 6 on the second working surface 7 of the second transmitting part 2. In this configuration, given a deflection of the piezoelectric actuator 11, the second transmitting part 2 and the control piston 10 connected thereto are moved downward. Depending on the choice of the angle c at which the first and the second working surface 6, 7 are inclined, the corresponding path transformation of the deflection HP of the actuator 11 is transformed into a corresponding deflection HN of the control piston 10.

We claim:

1. A device for transmitting a deflection of an actuator to a final control element, comprising:
    a first transmitting part operatively connected with an actuator and being subject to displacement by the actuator, said first transmitting part having a first working surface;
    a second transmitting part operatively connected to a final control element, said second transmitting part having a second working surface; and
    a freely movable ball interposed between and directly operationally interconnecting said first working surface and said second working surface, whereby a movement of said first transmitting part in a first direction of movement causes said ball to move along said first working surface and along said second working surface and to displace said second transmitting part in a second direction of movement.

2. The device according to claim 1, wherein said mechanical element is a freely movable wedge segment.

3. The device according to claim 1, wherein said first working surface is an inner conical surface, said second working surface is an outer conical surface, said outer conical surface is surrounded by said inner conical surface, said outer conical surface is inclined toward said inner conical surface, and including a bearing surface supporting said mechanical element and extending at a predefined angle relative to an axis of symmetry of the device.

4. The device according to claim 3, wherein said predefined angle is a right angle.

5. The device according to claim 3, wherein said bearing surface is an inner conical surface disposed symmetrically relative to the axis of symmetry and facing towards said first working surface.

6. The device according to claim 1, wherein one of said first and second working surfaces, along a line of movement of said mechanical element, has at least two subsurfaces oriented at different angles relative to an axis of symmetry of the device.

7. The device according to claim 1, wherein one of said first and second working surfaces, along a line of movement of said mechanical element, has a defined curved surface.

8. The device according to claim 1, wherein said first transmitting part and said second transmitting part are disposed substantially adjacent one another; wherein said first and second working surfaces converge at an angle of less than 180° towards one another, which further comprises a bearing surface supporting said mechanical element and extending at an angle of less than 90° relative to said first working surface and to said second working surface; said bearing surface, said first working surface, and said second working surface together defining a bearing space in which said mechanical element is disposed; and wherein, during a movement of said first transmitting part, said mechanical element is displaced laterally towards said second transmitting part, and said second transmitting part is moved counter the direction of movement of said first transmitting part.

9. The device according to claim 1, wherein said first transmitting part, said second transmitting part, said mechanical element, and the actuator, are prestressed relative to one another.

10. The device according to claim 1, which further comprises a guide element in which the second transmitting part is guided to move in the second direction, and wherein said first transmitting part, said second transmitting part, and said second guiding element together form an elastic cage in which said mechanical element is guided.

11. A device for transmitting a deflection of an actuator to a final control element, comprising:
    a first transmitting part operatively connected with an actuator and being subject to displacement by the actuator, said first transmitting part having a first working surface;
    a second transmitting part operatively connected to a final control element, said second transmitting part having a second working surface;
    a first guide for guiding said first transmitting part in a first direction of movement;
    a second guide for guiding said second transmitting part in a second direction of movement;
    a mechanical element disposed between said first working surface and said second working surface, and supported on a bearing surface, said first working surface, said second working surface, and said bearing surface being arranged in such a way that said mechanical element is restricted to moving only within a single plane of movement;
    said first working surface and said mechanical element being formed so that a movement of said first transmitting part in the first direction of movement causes a movement of said mechanical element at least partly transverse to the first direction of movement; and
    said second working surface being formed such that the transverse movement of the mechanical element is translated into a movement of said second transmitting part into a second direction of movement.

12. The device according to claim 11, wherein said first transmitting part, said second transmitting part, said mechanical element, and the actuator, are prestressed relative to one another.

13. The device according to claim 12, wherein said mechanical element is a freely movable ball.

14. The device according to claim 12, wherein said mechanical element is a freely movable wedge segment.

15. The device according to claim 12, wherein said first working surface is an inner conical surface, said second working surface is an outer conical surface, said outer conical surface is surrounded by said inner conical surface, said outer conical surface is inclined toward said inner conical surface, and wherein said bearing surface extends at a predefined angle relative to an axis of symmetry of the device.

16. The device according to claim 15, wherein said predefined angle is a right angle.

17. The device according to claim 15, wherein said bearing surface is an inner conical surface disposed symmetrically relative to the axis of symmetry and facing towards said first working surface.

18. The device according to claim 12, wherein one of said first and second working surfaces, along a line of movement of said mechanical element, has at least two subsurfaces oriented at different angles relative to an axis of symmetry of the device.

19. The device according to claim 12, wherein one of said first and second working surfaces, along a line of movement of said mechanical element, has a defined curved surface.

20. The device according to claim 12, wherein said first transmitting part and said second transmitting part are disposed substantially adjacent one another; wherein said first and second working surfaces converge at an angle of less than 180° towards one another, said bearing surface extends at an angle of less than 90° relative to said first working surface and to said second working surface; said bearing surface, said first working surface, and said second working surface together defining a bearing space in which said mechanical element is disposed; and wherein, during a movement of said first transmitting part, said mechanical element is displaced laterally towards said second transmitting part, and said second transmitting part is moved counter the direction of movement of said first transmitting part.

21. The device according to claim 11, wherein said first transmitting part, said second transmitting part, and said second guide together form an elastic cage in which said mechanical element is guided.

* * * * *